A. G. ELLIOTT AND J. SOUTHERN.
VALVE MECHANISM FOR INTERNAL COMBUSTION ENGINES.
APPLICATION FILED SEPT. 11, 1919.

1,411,208. Patented Mar. 28, 1922.

Inventors:
Albert George Elliott.
John Southern.
by their Attorney,

UNITED STATES PATENT OFFICE.

ALBERT GEORGE ELLIOTT AND JOHN SOUTHERN, OF DERBY, ENGLAND, ASSIGNORS TO ROLLS-ROYCE LIMITED, OF DERBY, ENGLAND.

VALVE MECHANISM FOR INTERNAL-COMBUSTION ENGINES.

1,411,208.   Specification of Letters Patent.   Patented Mar. 28, 1922.

Application filed September 11, 1919. Serial No. 323,044.

*To all whom it may concern:*

Be it known that we, ALBERT GEORGE ELLIOTT and JOHN SOUTHERN, of Derby, England, subjects of the King of England, have invented certain new and useful Improvements in Valve Mechanism for Internal-Combustion Engines, of which the following is a specification.

This invention relates to the valve mechanism of internal combustion engines and comprises improvements in the invention described in the specification of our prior application #296,133, filed May 10, 1919, which related to valve actuating mechanism in which the cylinders are provided with several valves of the mushroom type so disposed that their axes do not lie in planes at right angles to the axis of the cam-shaft.

In the aforesaid specification mechanism was described consisting of a shaft carrying cams with moving parts or plungers (hereinafter called plungers) actuated by the cams and rockers actuated by the plungers and in turn actuating the valves, the plungers being reciprocated in a plane at right angles to the axis of the cam shaft and the plunger reciprocated and the rockers swung in a plane coincident with, or in one or more planes parallel to, a plane containing the axis of the valve.

In the specification aforesaid the mechanism described and shown was one in which the plungers reciprocated vertically, or in directions parallel to the axes of the cylinders, the valves of which they were respectively adapted to operate.

The object of this invention is to arrange a similar mechanism in which the plungers reciprocate in a different direction in relation to the cylinders in order to reduce the overall height of the engine from that which it otherwise would be, and to enable alteration in the relative positions of other parts of the engine, as for example the raising of the cam shaft farther from the cylinders without unduly increasing the overall height of the engine.

In all such mechanisms it is essential, in order to prevent side thrust of any of the moving parts that the following conditions be attained, firstly, that the plunger shall reciprocate in a direction, and hence necessarily in a plane, at right angles to the axis of the cam shaft, and secondly that the plunger shall reciprocate and the rocker swing in a plane coincident with, or in one or more planes parallel to, a plane which contains the axis of the valve.

It will be observed that whatever may be the relationship between the axis of the valve and the axis of the cam-shaft, every plane in which the axis of the valve lies, except a plane which is parallel to the cam-shaft, is cut or pierced by the axis of the cam-shaft at some point in such last-mentioned axis, and further that the plane which is at right angles to the axis of the cam-shaft and which is cut or pierced by the axis of the cam-shaft at the same point, intersects the former plane on a line of intersection which varies from the vertical to the horizontal dependent on the axial position on the cam-shaft in relation to the axis of the valve at the point where such two planes are cut or pierced by the axis of the said cam-shaft.

In arranging the mechanism if the plunger reciprocates on the line of intersection of the two planes referred to (or on any other line parallel thereto provided it is always at right angles to the axis of the cam-shaft) and the rocker swings in the plane first referred to (that is, the plane in which the axis of the valve lies) the condition stated can always be attained, but unless the axis of the valve is in a plane at right angles to the axis of the cam shaft or the line of intersection of the two planes is vertical, the said plane first referred to in which the rocker has to swing will not be vertical and hence the axis on which it swings will have to be arranged out of the horizontal.

According to this invention the plunger is caused to reciprocate to and from the cam shaft in a direction other than vertical and (for all known required purposes) preferably horizontal or approximately horizontal. Having determined the point on the cam-shaft where the cam shaft cuts two such planes as aforesaid and the line of intersection of the two planes is horizontal, we construct the mechanism so that the plunger reciprocates to and from the axis of the cam shaft at that point horizontally and arrange the rocker to swing in the plane in which the said point lies, the axis of the valve and the axle on which the rocker swings being also tilted out of the horizontal accordingly.

The accompanying drawings illustrate the application of the invention to an engine having a steel cylinder provided with a spherical head furnished with four valves, the heads of the valves being arranged tangentially in relation to the head of the cylinder and consequently so that some or all of the axes of the valves are not in planes at right angles to the cam shaft.

In all the views a part of one cylinder only is shown, and like parts are given a similar letter of reference.

Figure 1:
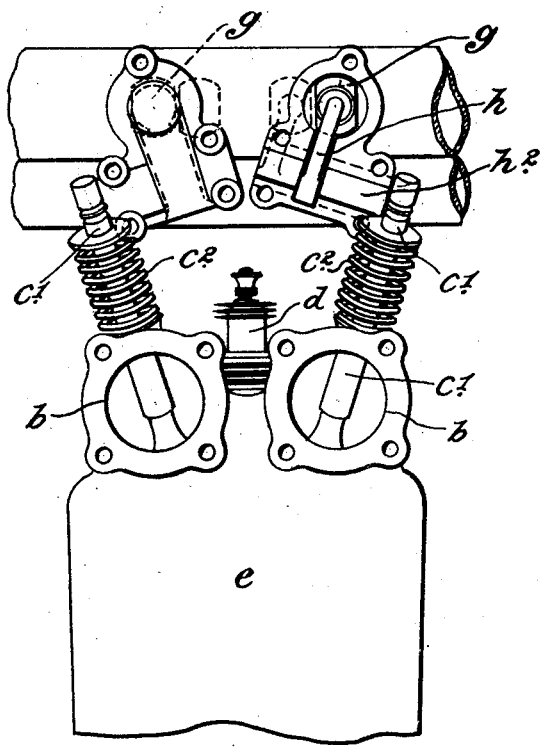
Fig. 1 is an elevation with one valve rocker cover removed.
Figure 3:
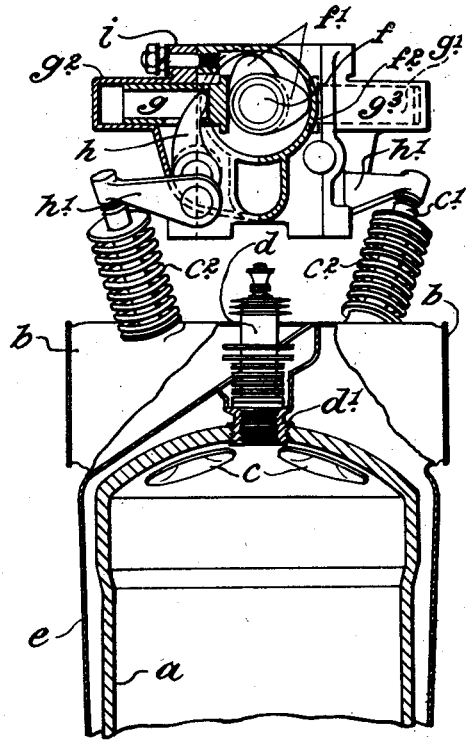
Fig. 3 is a sectional elevation on line 1—1 of Fig. 2 viewed from right to left.
Figure 2:
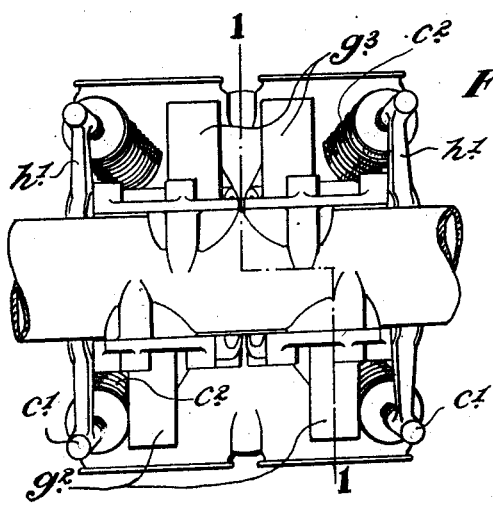
Fig. 2 is a plan view of Fig. 1, all the valve-rocker covers being shown in position.
Figure 4:
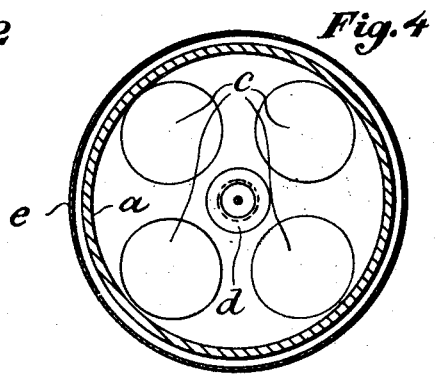
Fig. 4 is an inverted plan view of Fig. 3.

$a$ designates the cylinder having the water jacket $e$, $b$ the valve bends thereof, and $c$ the valve heads carried on stems $c^1$ and provided with the usual springs $c^2$.

$d$ is the ignition plug threaded to engage the internal threads of the boss $d^1$ which is screwed into the cylinder head and soldered or welded therein.

For the purpose of enabling said ignition plug to be disposed in the centre of the cylinder head as is generally desirable and as shown, the mechanism can be arranged with the cam shaft $f$ at a greater distance from the cylinders by disposing the plungers $g$ $g^1$ at the sides of said cam-shaft without increasing appreciably the overall height of the engine.

$f^1$ designates cams on the cam-shaft $f$, and $f^2$ is the cam-shaft casing, this latter being generally tubular except where enlarged to make room for the plungers $g$ $g^1$ and rockers $h$ $h^1$. At these parts there are openings provided with detachable covers $i$ which carry the plunger guides $g^2$ $g^3$ and also one half of the rocker bearings, the other half being formed on the casing.

$g$ are the plungers of two of the valves on one side of the engine and $g^1$ the plungers of the two valves on the other side, and $g^2$ and $g^3$ are the corresponding plunger guides, the plungers $g$ $g$ and $g^1$ $g^1$ being arranged on different centre lines so that each plunger may clear the cams $f^1$ arranged to actuate the plungers on the opposite side of the engine.

$h$ and $h^1$ are the arms of the rockers each carried by an axle or pivot $h^2$, the arm $h$ engaging with the plunger $g$ and the arm $h^1$ engaging with the stem of the valve and being mounted at the outer end of said pivot $h^2$.

In this specification it is assumed throughout that the cylinders are disposed vertically. If any cylinder is not disposed vertically then so far as relates to the mechanism appertaining thereto in the description there should be substituted for the vertical and horizontal respectively lines or planes as the case may be parallel to or at right angles to the axis of the cylinder.

What we claim as our invention and desire to secure by Letters Patent of the United States is:—

1. In an internal combustion engine, the combination of a cylinder; a cam shaft mounted thereabove; a plurality of valves for the cylinder head disposed with their stems inclined to the axis of said shaft; a set of rockers, one for each valve, to operate the same; a set of cams on said shaft; and a set of reciprocatory elements, one for each cam, interposed between the cams and the rockers to operate the latter from the former and movable along lines at right angles to the cam shaft and in an approximately horizontal direction; each rocker and the corresponding reciprocatory element moving in a plane parallel to a plane containing the stem of the associated valve, the axis of movement of the rocker being inclined to the horizontal and disposed perpendicular to the last-mentioned plane.

2. In an internal combustion engine, the combination of a cylinder; a cam shaft mounted thereabove; a plurality of valves on the cylinder head disposed with their stems inclined to the axis of said shaft; a set of rockers, one for each valve, to operate the same, each rocker having its axis of movement inclined to the horizontal and disposed perpendicular to a plane containing the corresponding valve stem; and a set of plungers, one for each cam, interposed between the cams and the rockers to operate the latter from the former and guided for axial movement in an approximately horizontal direction but along lines at right angles to the axis of the cam shaft; each rocker and the corresponding plunger moving in a plane parallel with the aforesaid plane containing the stem of the associated valve.

3. In an internal combustion engine, the combination of a cylinder; a cam shaft mounted thereabove; a plurality of valves on the cylinder head disposed with their stems inclined to the axis of said shaft; a set of rockers, one for each valve, to operate the same, each rocker having its axis of movement inclined to the horizontal and disposed perpendicular to a plane containing the corresponding valve stem; a set of elements, one for each cam, interposed between the cams and the rockers to operate the latter from the former and having reciprocating movement in an approximately horizontal direction but along lines at right angles to the axis of the cam shaft; each rocker and the corresponding reciprocatory element moving in a plane parallel with the aforesaid plane containing the stem of the associated valve; and an ignition device disposed in the center of the cylinder head with its axis approximately coincident with the axis of the cylinder.

4. In an internal combustion engine, the combination of a cylinder; a cam shaft mounted thereabove; a plurality of valves on the cylinder head disposed with their axes inclined to the axis of said shaft; a set of two-armed rockers, one arm of each rocker engaging the stem of a valve to operate the same; a set of cams on said shaft; and a set of reciprocatory elements, one for each cam, interposed between the cams and the rockers, each reciprocatory element cooperative with the other arm of the associated rocker to operate the latter and moving in a line at right angles to the cam shaft and in an approximately horizontal direction; each reciprocatory element and the arms of the corresponding rocker moving in planes parallel to the plane containing the axis of the associated valve, the axis of the rocker being inclined at right angles to the last-mentioned plane.

In witness whereof we have signed this specification in the presence of two witnesses.

ALBERT GEORGE ELLIOTT.
JOHN SOUTHERN.

Witnesses to the signature of John Southern:
F. W. TWONER,
RICHARD BETHELL WILSON.

Witnesses to the signature of Albert George Elliott:
H. R. CUTTEN,
T. PARSONS.